Patented May 30, 1950

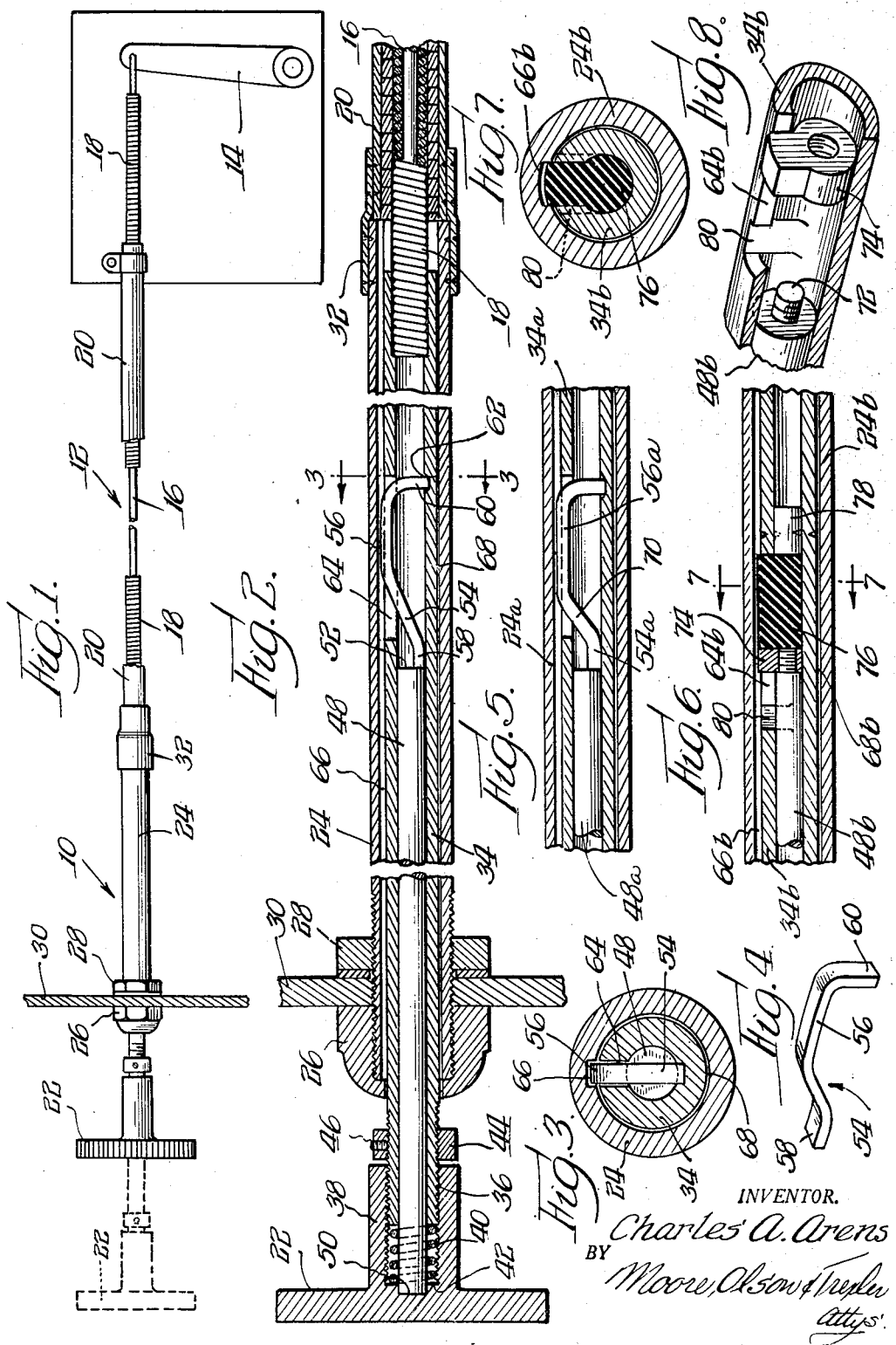

2,509,202

UNITED STATES PATENT OFFICE 2,509,202

MANUAL LOCKING CONTROL MECHANISM

Charles A. Arens, Chicago, Ill.

Application August 9, 1945, Serial No. 609,823

15 Claims. (Cl. 74—503)

This invention relates to control mechanisms, and more particularly to control mechanisms of the type adapted for manual reciprocation between predetermined limits, and including means for locking the control in various adjusted positions by a predetermined manipulation of the manual control handle, specifically rotary movement thereof.

It is an object of the invention to provide a control mechanism of the type defined of improved and simplified construction and improved operating characteristics.

More specifically stated, it is an object of the invention to provide an improved control mechanism, of the type defined, presenting a simplified construction which may be readily assembled at low cost and with minimum machining operations; and wherein the control structures may be smoothly and freely actuated when in unlocked position, while being readily actuatable to locked position wherein there is provided an effective locking action of either substantially positive locking effectiveness, or other predetermined frictional resistance to movement, as may be desired.

A further object of the invention is to provide a control mechanism of the type defined including an improved and simplified locking mechanism which is reliable and invariable in its locking action, and of the self-holding type regardless of vibration or the like to which the structure may be subjected.

Another object of the invention is to provide, in a control and locking mechanism of the type defined, an improved handle structure and arrangement.

A still further object of the invention is to provide in a control and locking structure of the type set forth, an improved structural arrangement of parts incorporating a deformable element such, for example, as a spring or block of compressible material, for effecting the locking functions.

Various other objects, advantages and features of the invention will be apparent from the following specification when taken in connection with the accompanying drawings, wherein certain preferred embodiments are set forth for purposes of illustration.

In the drawings, wherein like reference numerals refer to like parts throughout:

Fig. 1 is a general assembly view of a control installation incorporating a control mechanism constructed in accordance with and embodying the principles of the invention;

Fig. 2 is a longitudinal sectional view of the control mechanism of Fig. 1, on an enlarged scale;

Fig. 3 is a transverse sectional view of the structure of Fig. 2, taken as indicated by the line 3—3 thereof, and drawn on a further enlarged scale to show the details of construction;

Fig. 4 is a detail perspective view of the locking element, as incorporated in the structure of Figs. 1–3;

Fig. 5 is a partial longitudinal sectional view, similar to Fig. 2, but illustrating a modified form of locking element;

Fig. 6 is a longitudinal sectional view, also similar to Fig. 2, but illustrating a further modified form of locking or holding element;

Fig. 7 is an enlarged transverse sectional view of the structure of Fig. 6, on the line 7—7 thereof; and Fig. 8 is an exploded perspective view illustrating certain of the parts as incorporated in the structure of Figs. 6 and 7.

Referring more specifically to the drawings, and first to the structural embodiment illustrated in Figs. 1–4, the structure shown comprises a control mechanism, generally indicated by the numeral 10, associated with an elongated transmission cable 12, and adapted for the actuation of a controlled device in the form of a pivoted lever as indicated at 14, associated in any suitable manner with the unit or mechanisms to be actuated. More specifically, the flexible transmission cable comprises a core wire 16 disposed within an embracing wire coil 18, the parts 16 and 18 being integrally connected and movable within a stationary sheath coil 20. The control mechanism 10, presently to be described, is associated with the shiftable transmission cable 16—18 in a manner so as to effect the longitudinal reciprocation thereof through predetermined limits, under control of the manual control handle 22 of the control mechanism; and further includes provisions for locking the transmission cable and resultingly the operated member 14 in any selected position of adjustment, upon a suitable rotation of the manual control handle or member. It is to be understood that the control installation, as shown in Fig. 1, is set forth for illustrative purposes only, and that the control mechanism of the invention is adapted for use in any control installation wherein an operated device is to be actuated or adjusted within predetermined limits, and selectively locked in adjusted positions within the operating range of movement, as may be required.

Referring more specifically to the control mechanism, as best shown in Fig. 2, the mechanism comprises a frame sleeve 24 rigidly mounted, as by means of lock nuts 26 and 28, upon a suitable support structure 30, which may, for example, be the dashboard of a vehicle or the like. As shown, the lock nuts 26 and 28 engage the threaded end portion of the frame sleeve, and embracingly clamp the support panel. The end of the frame sleeve is connected to the fixed sheath 20 of the transmission cable structure, by suitable means such, for example, as a bracket or fitting 32.

Longitudinally reciprocable within the housing or frame sleeve 24, is an operating member in the form of a sleeve member 34 of elongated tubular construction. One end of the sleeve 34 is threaded as indicated at 36, this threaded end of the sleeve having rotatable threaded engagement with the hub portion 38 of the manual control handle 22. A compression spring 40 is arranged to bear between the end of the sleeve and a shoulder surface 42 of the handle member, whereby to apply sufficient tension to the threaded connection between the sleeve and handle, so as to prevent inadvertent or free handle rotation due to vibration or the like to which the mechanism may be subjected in certain control installations, as for example when used in association with internal combustion engines.

The end 36 of the operating sleeve also has threaded thereon a stop nut 44 which may be locked or held in adjusted position by means of a lock screw 46. The stop nut limits the threaded movement of the manual control handle relative to the operating sleeve, inwardly or to the right as seen in Fig. 2.

The opposite end of the sleeve 34 is rigidly connected to the shiftable cable elements 16—18, by suitable means such, for example, as swedging or the like.

Within the operating sleeve 34 there is disposed a control member 48 in the form of an elongated shaft or rod. The shaft or rod 48 is loosely or floatingly mounted within the operating sleeve, one end of the rod being seated within or abutted against a socket wall portion of the control handle, as indicated at 50. The opposite end surface 52 of the control rod is arranged to abut a locking element 54, whereby to control the actuation and movements thereof. More specifically, and as shown in the embodiment of Figs. 1–4, the locking element 54 is in the form of a deformable element, and specifically is in the form of a flexure spring, the detailed shaping of which is best illustrated in Fig. 4. As shown, the spring is in general U-shaped being provided with a bight portion 56 and end portions 58 and 60. The spring end 58 is adapted to be abutted by the end surface 52 of the control rod. The spring end 60 is seated within a shallow notch or socket 62 provided in the internal wall of the operating sleeve.

As best shown in Figs. 2 and 3, the spring bight portion 56 extends through an elongated slot or opening 64 in the operating sleeve 34, the bight portion extending upwardly into a spline or groove 66 running longitudinally of the fixed frame sleeve 24. Normally, when the parts are not in locked condition, the spring extends upwardly into the spline and between the side walls thereof, but does not engage the top or base wall of the spline groove. When the parts are in this position, as shown in Fig. 3, it will be seen that by reason of the fact that the spring extends through the slot 64 of the operating sleeve, and also into the spline groove of the fixed frame sleeve, the operating sleeve is thereby held from rotation. The operating sleeve, however, is not locked from longitudinal movement inasmuch as the spring is not seated against the spline base wall portion. Accordingly the operating sleeve 34 may be freely longitudinally actuated, by pushing or pulling upon the control handle 22, whereby to impart corresponding longitudinal increments of movement to the transmission cable 16—18. During such movement the shaft 48 and spring 54 move as a unit with the operating sleeve 34, the entire assembly being freely longitudinally shiftable within the fixed frame sleeve.

The sleeve 34, and resultingly the operated mechanisms connected for operation thereby, may be locked in any position within their range of travel by imparting a predetermined rotational movement to the manual control handle. More particularly, as the handle 22 is rotated, its threaded engagement with the non-rotatable operating sleeve causes the handle to be longitudinally translated, as a nut, in respect to the sleeve as the rotational movement is applied. This longitudinal translation of the handle in respect to the sleeve 34 causes a corresponding longitudinal movement to be imparted to the rod 48, relative to the sleeve, whereby to compress the flexure spring, one end of which is engaged by the rod and the other end of which is seated within the sleeve depression 62, as previously described. As compression is imparted to the spring, the bight portion 56 thereof is forced upwardly into seated engagement within the base of the spline groove 66 of the fixed frame sleeve, thereby forcing the operating sleeve downwardly in respect to the frame sleeve, producing frictional contact between the operating and frame sleeves at the point indicated by the reference numeral 68, locking the operating sleeve in longitudinally fixed position. Reverse rotational movement of the control handle releases the tension in the resilient flexure spring which upon return to normal or unlocked position frees the operating sleeve for longitudinal movement.

It will thus be seen that a control mechanism is provided, of simplified construction, which may be readily fabricated and assembled. When the parts are unlocked, the operating sleeve 34, together with the control rod 48 and the flexure spring, is smoothly and freely shiftable within the fixed frame sleeve, under control of the handle 22. By rotation of the control handle, in any longitudinal position of the parts, the operating sleeve and elements connected thereto may be selectively locked in position, and unlocked, as may be required. Various degrees of locking may be imparted, depending upon the degree of rotation imparted to the control handle, which in turn determines the degree of tension and distortion imparted to the deformable spring element. The maximum desired locking tension may be limited by the adjustable positioning of the stop nut 44, which determines the maximum possible longitudinal translation of the control handle relative to the operating sleeve. Ordinarily it may be desirable to vary the locking tension between full locking and complete unlocking by a partial rotation of the control handle. This, however, is determined by the pitch of the screw threaded connection between the handle and the sleeve 34, and by the characteristics of the spring 54, which may be selected as desired. A relatively fine pitch of the threads 36 is preferred so as to insure that the locking mechanism will be self-holding when actuated to locked position, and after the operator removes his hand from the control handle. In this connection it will be seen that the spring tension of the spring 54 acts as a resilient pressure means for preventing inadvertent rotation or loosening of the control handle upon the threaded end of the sleeve, due to vibration or the like. As previously stated, the compression spring 40 acts to hold the handle member from inadvertent rotation due to vibration, when the locking action of the spring 54 is released.

As previously indicated, the spring 56 is at all times projected between the side walls of the spline 66, whereby to hold the operating sleeve 34 from rotation, both when the structure is locked or unlocked. By this means it is insured that the rod 48 will be properly projected longitudinally in respect to the operating sleeve 34, upon rotation of the control handle, the sleeve being continuously held from inadvertent rotation, insuring a proper base structure upon which the control handle may be threaded as it is turned. A reliable and invariable locking action is thus insured.

In Fig. 5 an embodiment is illustrated generally similar to that previously described, except that in this instance the locking spring, as indicated at 54a, is provided with a relatively sharply bent portion 70 which acts as a means for limiting the building up of further tension in the spring after such tension has been built up to a predetermined amount. More particularly, the bent portion 70 will yield after a predetermined upward thrust has been imparted to the spring portion 56a, after the rod 48a has been projected a predetermined distance; so that should the rod be further projected no substantially greater spring tension will be applied. By this means the spring tension is sensitive to rotation of the control handle only to a predetermined value. Such an arrangement, limiting the maximum locking action, may in certain instances be desirable. Obviously the stop nut, as indicated at 44 in Fig. 2, may or may not be employed as desired.

In Figs. 6-8 a further embodiment of the invention is illustrated employing a specifically different deformable locking element, the element in this instance being a block of resilient compressible material such, for example, as rubber or the like. More specifically, the control rod as indicated at 48b is in this instance provided with a threaded extension 72 which is threaded into a plunger block 74, the plunger block member being thereby rigidly mounted upon the end of the control rod. Plunger member 74 is arranged to engage against a rubber block 76 having a cross section substantially similar to that of the plunger, the uppermost portions of the plunger and rubber block being projected through a longitudinal slot 64b formed in the operating sleeve 34b. As best shown in Fig. 7, the plunger member and block are continuously projected between the side walls of a spline 66b formed in the fixed frame sleeve 24b, similar to the manner in which the spring bight portion 56 projects into the spline slot 66 in the structure previously described. However, as in the previously described structure, normally the parts do not engage the base wall of the spline, thus permitting the operating sleeve 34b to be freely longitudinally projected.

Upon rotation of the control handle, resulting in the longitudinal projection of rod 48b relative to the operating sleeve 34b, the rubber block 76 is compressed to thrust the upper portion of the block into engagement with the base of the frame sleeve spline 66b, whereby to frictionally engage the operating and frame sleeves at the point 68b, locking the operating sleeve from movement. A block member, as indicated at 78, is anchored within the bore of the operating sleeve, as shown in Fig. 6, to provide a firm reaction base for the end wall of the rubber block member. It is believed that the mode of operation of the structure of Figs. 6-8 will be clear from what has heretofore been pointed out in respect to the operation of the structure of Figs. 1-4.

To facilitate assembly of the parts, it will be seen that the slot 64b is provided with a widened portion, as indicated at 80. The plunger block 74 may be introduced into the operating sleeve through this widened slot portion, and then assembled onto the end of the rod 48b.

It is obvious that various changes may be made in the specific embodiments shown and described without departing from the spirit of the invention. The invention is accordingly not to be limited to the specific embodiments illustrated, but only as indicated in the following claims.

The invention is hereby claimed as follows:

1. A control mechanism comprising a frame member, an operating member shiftable in respect to the frame member and adapted to be connected to a device to be controlled, a control handle operatively connected to the operating member for controlling its movements, and locking means comprising a deformable locking element separate from the operating member for locking the operating member from movement in respect to the frame member, said deformable locking element being shiftable with the control handle and said locking means being operable to locking position by a rotary movement of said control handle relative to the operating member.

2. A control mechanism comprising a frame member, an operating member shiftable in respect to the frame member and adapted to be connected to a device to be controlled, a control handle operatively connected to the operating member for controlling its movements, and locking means comprising a flexure spring for locking the operating member from movement in respect to the frame member, the spring ends being compressed toward each other to thereby extend the spring bight portion by a rotary movement of said control handle.

3. A control mechanism comprising a frame member, an operating member shiftable in respect to the frame member and adapted to be connected to a device to be controlled, a control handle operatively connected to the operating member for controlling its movements, and locking means comprising a deformable sheet metal element radially adjustable in respect to the axis of movement of the operating member for locking the operating member from movement in respect to the frame member, said locking means being operated to locking position by a rotary movement of the control handle, and means for holding said element in the same angular position in respect to the axis of movement of the operating member in all positions of adjustment of the control mechanism.

4. A control mechanism comprising an elongated frame sleeve, an elongated operating member shiftable within the frame sleeve and adapted to be connected to a device to be controlled, a control handle operatively connected to the operating member for controlling its movements, and locking means comprising an elongated control member disposed within the operating member and a deformable element operated thereby for locking the operating member from movement in respect to the frame sleeve, said locking means being operable to locking position by a rotary movement of said control handle.

5. A control mechanism comprising a frame member, an operating member shiftable in respect to the frame member and adapted to be connected to a device to be controlled, a control handle operatively connected to the operating member for controlling its movements, a control member shiftable with the operating member and also shiftable relative thereto upon a rotary movement of the control handle, and locking means comprising a deformable sheet metal locking element actuated by the relative shifting of the operating member and control member for locking the operating member from shifting in respect to the frame member.

6. A control mechanism comprising a frame member, an operating member shiftable in respect to the frame member and adapted to be connected to a device to be controlled, a control handle operatively connected to the operating member for controlling its movements, a control member shiftable with the operating member and also longitudinally shiftable relative thereto upon a rotary movement of the control handle, and locking means actuated by the relative longitudinal shifting of the operating member and control member for locking the operating member from shifting in respect to the frame member.

7. A control mechanism comprising a frame sleeve, a shiftable sleeve longitudinally shiftable within the frame sleeve, a control handle operatively connected to said shiftable sleeve for controlling its movements, a control member within the shiftable sleeve movable therewith and also longitudinally shiftable relative thereto upon a rotary movement of the control handle, and locking means actuated by the relative longitudinal shifting of the shiftable sleeve and control member for locking the shiftable sleeve from movement in respect to the frame sleeve.

8. A control mechanism comprising a frame sleeve, a shiftable sleeve longitudinally shiftable within the frame sleeve, a control handle operatively connected to said shiftable sleeve for controlling its movements, a control member within the shiftable sleeve movable therewith and also shiftable relative thereto upon a rotary movement of the control handle, and locking means comprising a deformable locking element actuated by the relative shifting of the shiftable sleeve and control member for locking the shiftable sleeve from movement in respect to the frame sleeve.

9. A control mechanism comprising a frame sleeve, a first control member in the form of a shiftable sleeve longitudinally shiftable within the frame sleeve, a control handle operatively connected to said shiftable sleeve for controlling its movements, a second control member within the shiftable sleeve movable therewith and also shiftable relative thereto upon a rotary movement of the control handle, said control handle having screw threaded connection with one of said control members, and locking means comprising a deformable element actuated by the relative shifting of the control handle in respect to its screw connected control member for locking the shiftable sleeve from movement in respect to the frame sleeve.

10. A control mechanism comprising a frame member, an operating member shiftable in respect to the frame member and adapted to be connected to a device to be controlled, a control handle directly connected to the operating member for controlling its movements, a control member shiftable with the operating member and also shiftable relative thereto upon a rotary movement of the control handle, and locking means comprising a deformable element radially adjustable in respect to the axis of movement of the operating member and actuated by the relative shifting of the operating member and control member for locking the operating member from shifting in respect to the frame member, and means for holding said deformable element in the same angular position in respect to the axis of movement of the operating member during the operation of the control mechanism.

11. A control mechanism comprising a frame sleeve, a shiftable sleeve longitudinally shiftable within the frame sleeve, a control handle operatively connected to said shiftable sleeve for controlling its movements, a control member within the shiftable sleeve movable therewith and also shiftable relative thereto upon a rotary movement of the control handle, and locking means comprising a deformable element radically adjustable in respect to the axis of movement of the shiftable sleeve and actuated by the relative shifting of the shiftable sleeve and control member for locking the shiftable sleeve from movement in respect to the frame sleeve, and means for holding the deformable element in fixed angular position in respect to the axis of movement of said shiftable sleeve during the rotary movement of the control handle.

12. A control mechanism comprising a frame sleeve, a shiftable sleeve longitudinally shiftable within the frame sleeve, a spline for holding the shiftable sleeve from rotary movement, a control handle operatively connected to said shiftable sleeve for controlling its movements, a control member within the shiftable sleeve movable therewith and also shiftable relative thereto upon a rotary movement of the control handle, and locking means comprising a deformable element projected through the shiftable sleeve into engagement with the frame sleeve and actuated by the relative shifting of the shiftable sleeve and control member for locking the shiftable sleeve from movement in respect to the frame sleeve.

13. A control mechanism comprising a frame sleeve, an operating sleeve shiftable within the frame sleeve and adapted to be connected to a device to be controlled, a spline connection between the operating sleeve and frame sleeve for holding the operating sleeve from rotary movement, a control handle threadedly connected to the operating sleeve for controlling its movements, a control shaft within the operating sleeve movable therewith and also longitudinally shiftable relative thereto upon a rotary movement of the control handle, and locking means comprising a deformable element projected through the operating sleeve by the relative shifting of the operating sleeve and the control member into engagement with the frame sleeve for locking the operating sleeve from movement in respect to the frame sleeve.

14. A control mechanism comprising a frame member, an operating member shiftable in respect to the frame member and adapted to be connected to a device to be controlled, a control handle operatively connected to the operating member for controlling its movements, and locking means comprising a sheet metal member forming a deformable flexure spring for locking the operating member from movement in respect to the frame member, said sheet metal member being shiftable with the control handle and being operable to locking position by a rotary movement of said control handle.

15. A control mechanism comprising a frame member, an operating member shiftable in respect to the frame member and adapted to be connected to a device to be controlled, a control handle operatively connected to the operating member for controlling its movements, and locking means comprising a block of resilient compressible material forming a deformable locking element for locking the operating member from movement in respect to the frame member, said deformable locking element being shiftable with the control handle and said locking means being operable to locking position by a rotary movement of said control handle.

CHARLES A. ARENS.

REFERENCES CITED

The following references are of record in the file of this patent:

UNITED STATES PATENTS

| Number | Name | Date |
|---|---|---|
| 1,171,845 | Heaslet | Feb. 15, 1916 |
| 1,559,306 | Berkman | Oct. 27, 1925 |
| 2,205,987 | McCarthy | June 25, 1940 |
| 2,262,448 | Boyce et al. | Nov. 11, 1941 |
| 2,295,731 | Groves | Sept. 15, 1942 |
| 2,319,041 | Crouse | May 11, 1943 |
| 2,329,932 | Nelson | Sept. 21, 1943 |

FOREIGN PATENTS

| Number | Country | Date |
|---|---|---|
| 502,490 | Great Britain | Mar. 20, 1939 |

Certificate of Correction

Patent No. 2,509,202　　　　　　　　　　　　　　　　　　　May 30, 1950

CHARLES A. ARENS

It is hereby certified that error appears in the printed specification of the above numbered patent requiring correction as follows:

Column 8, line 30, for "radically" read *radially*;

and that the said Letters Patent should be read as corrected above, so that the same may conform to the record of the case in the Patent Office.

Signed and sealed this 28th day of November, A. D. 1950.

[SEAL]

THOMAS F. MURPHY,
*Assistant Commissioner of Patents.*